June 5, 1956

W. F. F. MARTIN-HURST 2,749,038

APPARATUS FOR COMPUTING THE PRODUCT
OR RATIO OF TWO VARIABLES

Filed May 9, 1952

MACH.

MACH.

Inventor
William Frederick Ferris Martin-Hurst
By
Attorneys.

United States Patent Office 2,749,038
Patented June 5, 1956

2,749,038

APPARATUS FOR COMPUTING THE PRODUCT OR RATIO OF TWO VARIABLES

William F. F. Martin-Hurst, Cefn Coed, near Merthyr Tydfil, Wales, assignor to Teddington Aircraft Controls Limited, Cefn Coed, near Merthyr Tydfil, South Wales Application May 9, 1952, Serial No. 286,964

Claims priority, application Great Britain May 11, 1951

2 Claims. (Cl. 235—61)

This invention relates to computing apparatus for deriving the product or ratio of two variables and if desired for providing an indication of the derived function on a dial and pointer or other form of indicating instrument, and it relates more particularly to a Machmeter which is used on aircraft to indicate the so-called "Mach number" at which the aircraft is flying, this number being a function of the ratio $$\frac{P-S}{S}$$

where P is the pressure developed due to air velocity or pitot head reading and S is the static pressure or static reading.

"Mach numbers" can be plotted on a graph, where the co-ordinates represent $P-S$ and S respectively, as straight lines passing through the origin of the co-ordinates, and the present invention provides a novel or improved mechanism for combining the movements of pressure sensitive elements responsive to the basic variables such as to produce a final movement proportional to the desired ratio, the operation of said mechanism being analogous to the method of plotting a graph, for example, of the form above mentioned, having either orthogonal or skew co-ordinates.

According to the invention the improved apparatus comprises two pressure sensitive devices responsive respectively to the two variables to be related, each of said devices being arranged to actuate an arm or like elongated member in such manner that the respective arms remain parallel to two basic related lines or axes and the two arms being disposed so that they intersect or abut at a predetermined angle, a follower arm which is carried by an oscillatable shaft and is caused to move in strict accord with the movements of the point of intersection or abutment of the arms, and means for transmitting the movements of the shaft to an indicating instrument.

Figure 1:
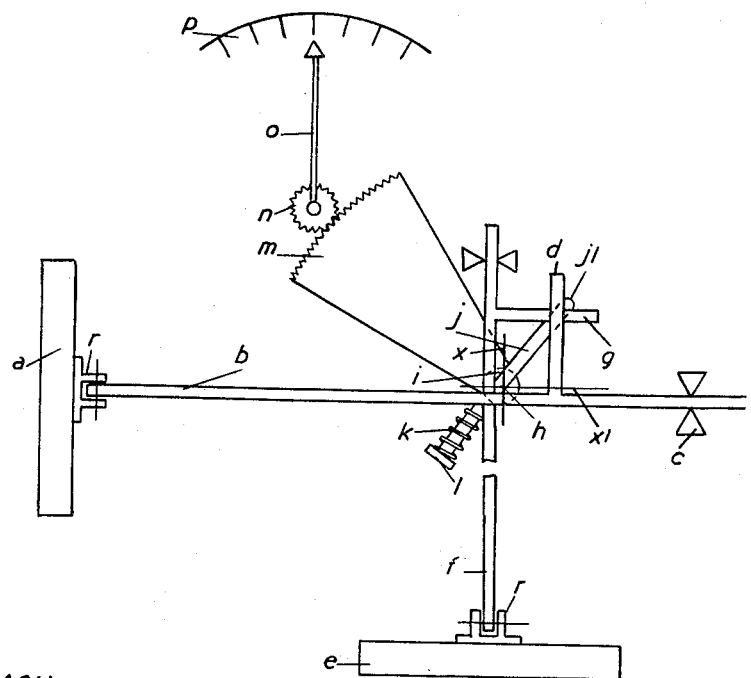
Figure 2:
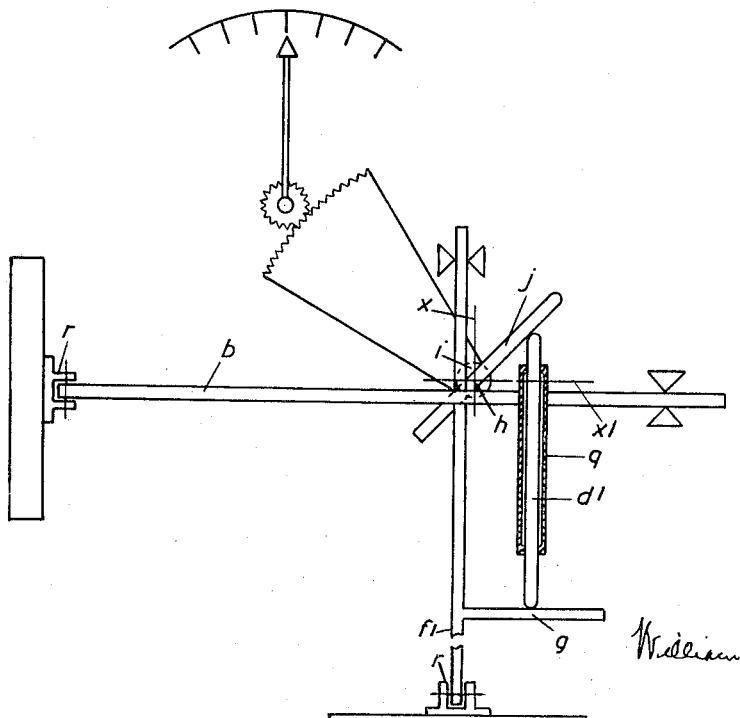

For a fuller understanding of the invention reference will now be made to the accompanying drawings wherein:

Fig. 1 shows diagrammatically a Machmeter constructed according to the invention and based on a graph analogy using orthogonal axes or co-ordinates and Fig. 2 is a modification of Fig. 1.

Referring first to Fig. 1, $a$ represents a bellows, capsule or equivalent device which is evacuated and subjected externally to static (atmospheric) pressure. Attached to the movable wall of device $a$ is a rod $b$ which is guided by means $c$ so that it can only move axially and which is provided with a laterally extending arm $d$. A second pressure responsive device $e$, which is subjected internally and externally to pitot head and static pressures respectively so that the device as a whole responds to the difference between these two pressures, that is, $P-S$, actuates in like manner a second rod $f$ also provided with a lateral arm $g$, the two devices being so disposed that the arms $d$ and $g$ cross or intersect at right angles. Thus the two arms during their movements induced by deflections of the devices $a$, $e$ remain parallel to the axes $x$, $x'$ of a graph which has its origin at the point $h$ but the position of the point of intersection of the arms will vary upon the graph.

Assuming lines are drawn from the various positions occupied by this point of intersection to the origin $h$ of the co-ordinates, the angles between such lines and the basic ordinate $x'$ are functions of the various ratios between the deflections of the two pressure responsive devices, that is, where $\theta$ is the angle then $$\tan \theta \propto \left(\frac{P-S}{S}\right)^n$$

where $n$ is any number, fraction or integer determining the law connecting the pressure $P-S$ and S.

In order to transmit variations in the angle to suitable indicating means an oscillatable shaft $i$ is so supported that its centre or axis coincides with the origin $h$ of the graph, and a follower arm $j$ carried by this shaft follows the movement of the point of intersection of the two arms $d$, $g$. The follower arm consists of a rod slidably mounted in a diametrical bore in the shaft, one end of said rod having a lateral projection $j'$ engaging in the angle defined by the intersecting arms whilst the other end of the rod is encircled by a compression spring $k$ which is located between the shaft and an abutment $l$ on the end of the rod and serves to hold the projection $j'$ in firm engagement with said arms at their point of intersection. Oscillating movement thus imparted to the shaft $i$ upon variations in the point of intersection of the arms is transmitted to indicating means by any suitable mechanism, for example, a toothed quadrant $m$ fast on the shaft may engage a pinion $n$ fast with the pointer $o$ of a dial and pointer indicating instrument, the dial $p$ being marked with a scale of Mach numbers.

In the alternative arrangement shown in Fig. 2, the arm $d'$ is extendable and takes the form of an axially movable rod mounted in a guide sleeve $q$ carried by rod $b$, and in this instance said arm merely abuts at one end a plane surface on the arm $g$. The other end of the arm $d'$ abuts a plane surface on the follower arm $j$ which actuates the oscillatable shaft $i$ and through it the indicating instrument as in the form previously described. As the upper end of the arm $d'$ follows exactly the movements of the lower end of said arm it will be seen that the follower arm $j$ is caused to move exactly as though it followed the point of abutment of arms $d'$ and $g$.

Here also the arms $d'$ and $g$ remain throughout their movements parallel to the axes $x$ and $x'$ although in this instance the point of origin $h$ is displaced from the position shown in Fig. 1 a distance depending upon the length of the arm $d'$.

Where a computation is to be based on a graph having skew co-ordinates, the intersecting rods and arms would be disposed at appropriate angles and to make an apparatus adaptable in this respect the rods $b$, $f$ may be pivotally or hingedly attached to the movable walls of the pressure responsive devices as indicated at $r$ so that their angular positions may be varied.

Thus it will be seen that the invention provides simple but effective means for combining the displacement of two variables to give a final movement proportional to a desired ratio without resorting to approximations.

I claim:

1. A Machmeter for computing the ratio of the air speed of an aircraft in flight to the speed of sound, comprising two pressure sensitive devices responsive respectively to the pressure developed by the air speed of the aircraft minus the static air pressure and to the static air pressure, a pair of rods guided for movement longitudinally only and in relatively angular paths and connected to and movable linearly by the respective pressure sensitive devices and carrying arms extending laterally from the respective rods, one of said arms being slidable transversely of the respective rod and arranged to abut at one end the other arm at a predetermined angle and said arms being movable linearly by the respective rods to maintain said arms throughout their movements in parallelism with the axes of a basic graph, an oscillatable shaft disposed at a point corresponding to the point of origin of such graph axes, a follower arm carried by said shaft and arranged to abut at a point spaced from said shaft the other end of said slidable arm, and an indicating instrument having means for transmitting thereto movements of said shaft.

2. A Machmeter as defined in claim 1, wherein said slidable arm comprises a sleeve carried by one of said rods, and a rod-like element mounted for axial movement in the sleeve and abutting the arm carried by the other of said rods.

References Cited in the file of this patent

UNITED STATES PATENTS

| | | |
|---|---|---|
| 1,282,553 | Eaton | Oct. 22, 1918 |
| 2,070,842 | Reichel et al. | Feb. 16, 1937 |
| 2,522,337 | Angst | Sept. 12, 1950 |

FOREIGN PATENTS

| | | |
|---|---|---|
| 717,529 | France | May 22, 1931 |